United States Patent
Kolberg

(10) Patent No.: US 7,182,109 B2
(45) Date of Patent: Feb. 27, 2007

(54) FILLING PIPE DISCHARGE NOZZLE

(75) Inventor: Ralf Kolberg, Bruhl (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 0 days.

(21) Appl. No.: 11/344,593

(22) Filed: Jan. 31, 2006

(65) Prior Publication Data

US 2006/0185761 A1 Aug. 24, 2006

(30) Foreign Application Priority Data

Jan. 31, 2005 (DE) .................. 10 2005 004 551

(51) Int. Cl.
*B65B 1/04* (2006.01)

(52) U.S. Cl. .................. 141/301; 141/198; 220/86.2; 137/592

(58) Field of Classification Search ............... 141/301, 141/302, 95, 198, 349, 350; 220/86.2; 137/592
See application file for complete search history.

(56) References Cited

U.S. PATENT DOCUMENTS

| 6,155,316 | A | 12/2000 | Benjey |
| 6,230,739 | B1* | 5/2001 | Gericke ................... 137/588 |
| 6,408,903 | B1* | 6/2002 | Theuer et al. ............. 141/348 |
| 6,415,827 | B1* | 7/2002 | Harris et al. ............. 141/348 |
| 6,675,843 | B2* | 1/2004 | Yonezawa et al. ......... 141/301 |
| 2001/0037840 | A1 | 11/2001 | Pozgainer |
| 2001/0040162 | A1 | 11/2001 | Stiegler et al. |

* cited by examiner

*Primary Examiner*—Steven O. Douglas
(74) *Attorney, Agent, or Firm*—Grossman Tucker Perruault & Pfleger, PLLC

(57) ABSTRACT

A discharge nozzle for the filling pipe of a motor vehicle fuel tank for the introduction of fuel into the tank includes a check flap which is held by spring loading in a closed position, being caused to bear pivotably against the mouth opening of the nozzle. The check flap is sealed in relation to the mouth opening of the nozzle by way of at least one sealing element with a peripherally extending sealing lip. The sealing lip extends radially outwardly in relation to the cross-section of the discharge mouth opening.

14 Claims, 4 Drawing Sheets

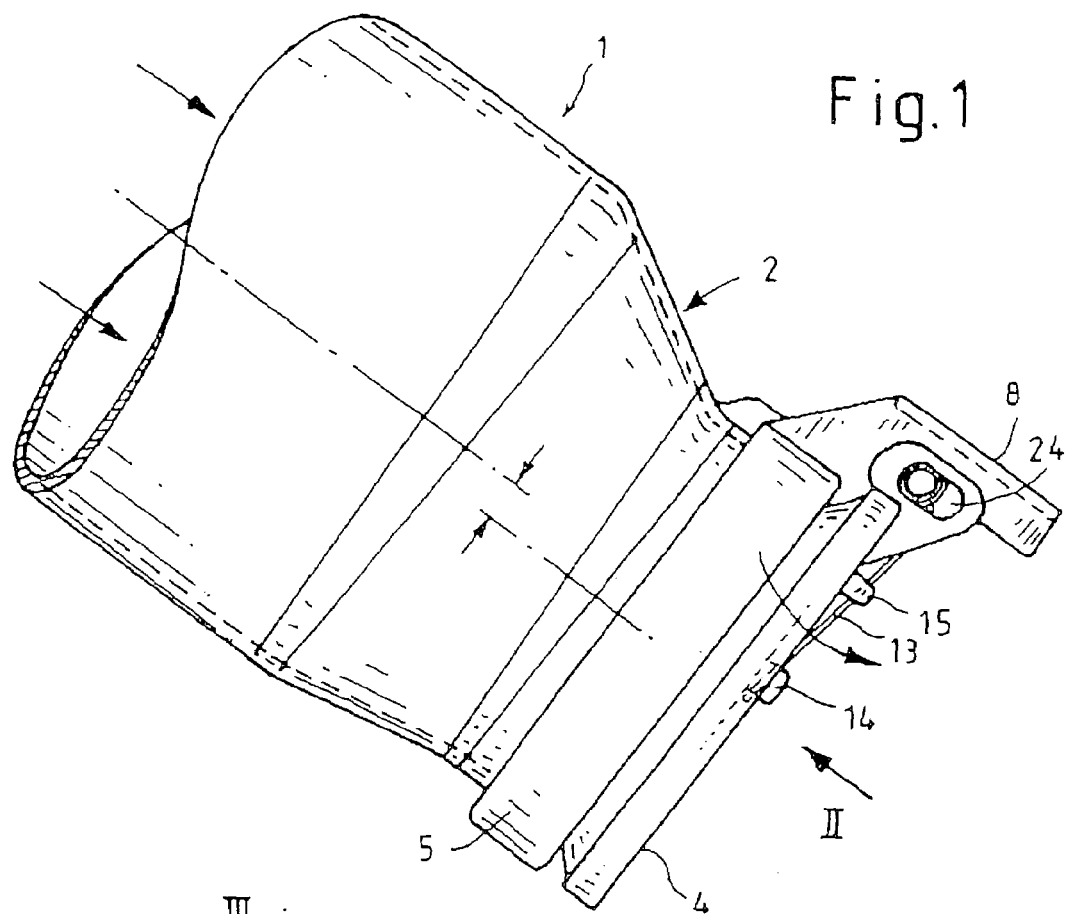
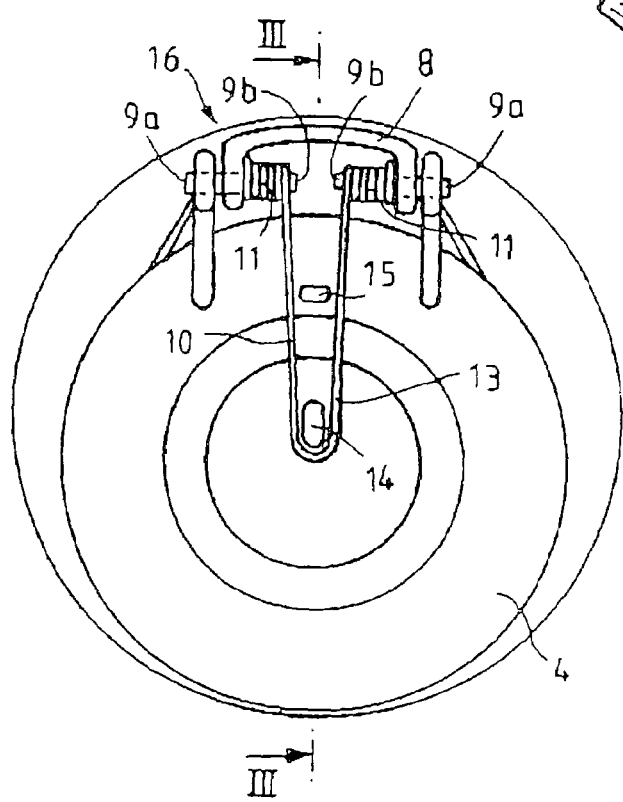

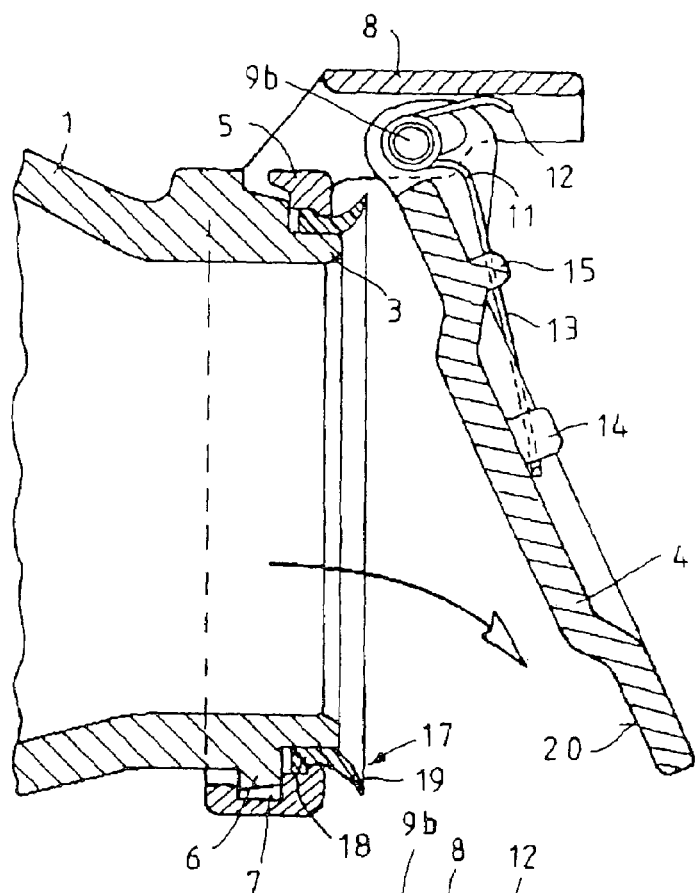
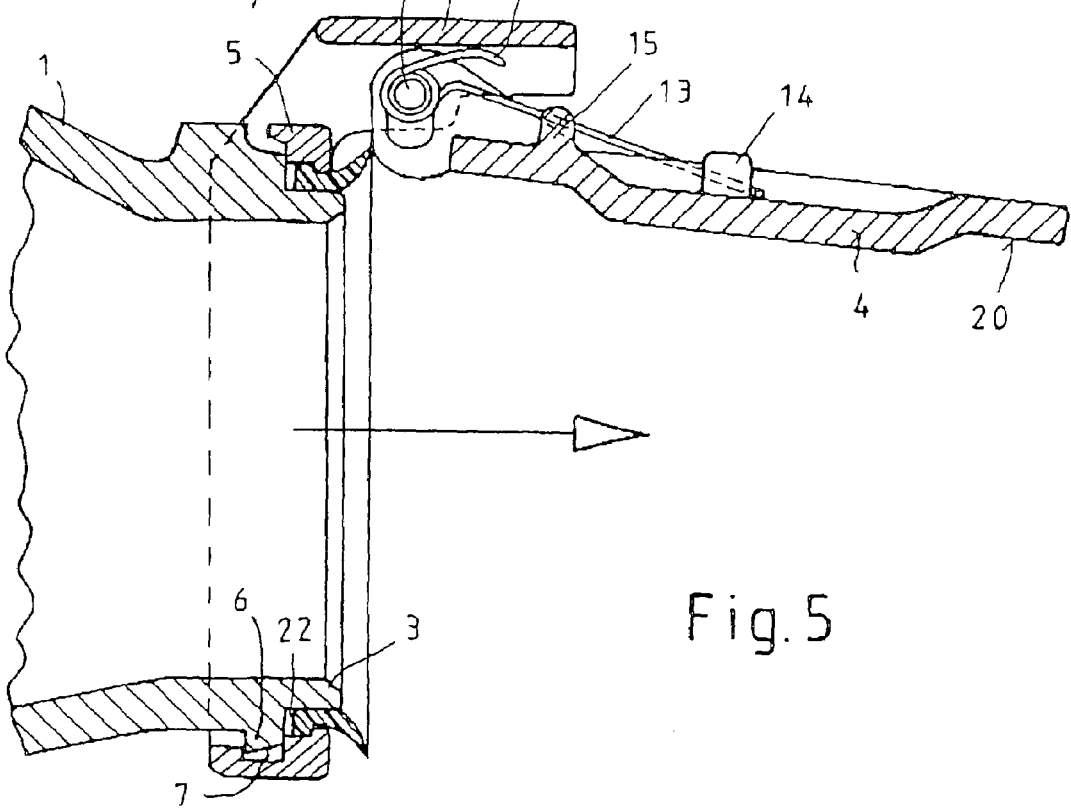

FILLING PIPE DISCHARGE NOZZLE

CROSS-REFERENCES TO RELATED APPLICATIONS

This application claims the priority of German patent application Serial No. 10 2005 004 551.0 filed Jan. 31, 2005, the subject-matter of which is incorporated herein by reference.

FIELD OF THE INVENTION

The invention concerns a discharge nozzle for the filling pipe of a fuel tank, for example for a motor vehicle.

BACKGROUND OF THE INVENTION

DE 199 39 908 A1 discloses a fuel tank in which a closure flap is arranged pivotably at the end of the fuel tank filling pipe, being the end which is towards the interior of the fuel tank and which projects into the interior of the tank itself. The closure flap is movable between a closed position in which it shuts off the through-flow cross-section of the filling pipe and an open position in which it opens that cross-section. The closure flap is urged in the direction of the closed position by a spring and is pivotable towards its open position by a flow of fuel as it flows into the fuel tank. The closure flap is intended to prevent what is referred to as the spit-back effect in the process of filling the fuel tank, for example in the case of a motor vehicle.

That spit-back effect is caused by the internal pressure in the fuel tank abruptly rising towards the end of a tank filling process, because of actuation of a tank filling vent valve. That increase in pressure in the interior of the tank causes fuel to pass upwardly in the filling pipe and thus causes the tank refueling gun to be switched off automatically. The pressure conditions in the interior of the fuel tank at the end of the refueling phase however can be such that fuel spits back out of the filling pipe. It has been found that such a spit-back effect occurs in particular when filling a fuel tank with diesel fuel as diesel fuel has a tendency to foam up as it is flowing into the tank.

The closure flap constituting a check valve as described in DE 199 39 908 A1 is intended to perform the function, as set forth therein, of preventing fuel from escaping from the fuel tank through the filling pipe in the situation where the portion of the filling pipe, which is at the outside of the tank, is damaged as by being holed or completely severed in an accident. On the one hand, that arrangement is intended to afford sealing integrity in relation to a column of fuel rising upwardly within the filling pipe from the interior of the tank, while on the other hand the check flap arrangement is intended to be easy to open under the pressure of the fuel as it flows into the tank in a refueling process.

To adequately seal off the closure flap, DE 199 39 908 A1 proposes a sealing ring of elastomer material, which is adapted to co-operate with a sealing surface having a substantially line-shaped sealing edge, on the end of the filling pipe. The co-operation of the line-shaped sealing edge and the sealing element means that a comparatively high closure force is required to achieve sealing integrity at that location. As indicated hereinbefore however it is desirable to afford a reliable sealing effect while involving a low level of closure flap closing force, that is to say a closing force which allows the closure flap to open relatively easily under the pressure of the incoming flow of fuel. Because of the comparatively high pressure in relation to surface area as between the sealing element and the sealing edge, which is required in the above-discussed arrangement to afford sealing integrity, a reliable sealing effect with a low level of closing force is only possible if the spring which is operable to hold the check flap in the closed position is of a suitable design. That however has an adverse effect on the ease of movement of the closure flap and the ease of opening same, under the force of the incoming flow of fuel.

In another discharge nozzle for a filling pipe of a fuel tank such as for a motor vehicle as disclosed in DE 200 01 334 U1, comprising a check flap held in a closed position under a spring loading and caused to bear pivotably against the mouth opening of the nozzle, with the check flap being sealed in relation to the nozzle by way of a sealing element with a peripherally extending sealing lip, the structure involved is designed to address the problem of sealing integrity of the check flap, using a sealing ring which is arranged at the end of the discharge nozzle and which has the sealing lip which is directed radially inwardly and engages over the end face of the discharge nozzle. It is stated therein that the structure of that arrangement suffers from the disadvantage that, in the presence of fuel, the inside edge of the sealing lip adopts a corrugated or wavy configuration in the peripheral direction and accordingly lifts off in part from the check flap so that the sealing lip does not bear in completely sealing relationship against the check flap. That publication therefore proposes the provision of a sealing limb at the free inside edge of the sealing lip, the sealing limb extending axially in a direction towards the check flap which then bears against the sealing lip.

It has been found in practice that such a design configuration for the discharge nozzle is not of an optimum nature. The structure involved therein only partially counteracts the corrugation effect for the seal in the presence of fuel, for example fuel which has a high proportion of alcohol in it. The closure pressure of the check flap or valve flap must be set to be so slight that easy opening of the flap is guaranteed, even when the flow of fuel by volume passing into the tank through the discharge nozzle is comparatively slight. Depending on the respective kind of fuel and the period for which the seal is immersed in the fuel the seal can nonetheless suffer from the corrugation effect so that there is no longer any guarantee of sealing integrity by virtue of line contact between the sealing surfaces.

In addition the pressure of a column of liquid which occurs at the check flap acts both axially and also radially so that it is not impossible that the radially acting liquid pressure can still lift off the seal. At the least the radial pressure of the liquid acts against the closing pressure of the check flap, which is produced by the spring, so that for that reason also it is not possible to guarantee that the sealing element bears in line sealing contact against the sealing surface over a prolonged period of time.

SUMMARY OF THE INVENTION

An object of the present invention is to provide a discharge nozzle for the filling pipe of a fuel tank, for example for a motor vehicle, which is improved in terms of its sealing action.

Another object of the present invention is to provide a fuel tank filling pipe discharge nozzle including a check valve spring-loaded towards a closed position and openable by way of a flow of fuel into the tank, which enjoys a satisfactory sealing effect while being comparatively readily openable by the incoming flow of fuel.

Yet another object of the present invention is to provide a motor vehicle fuel tank filling pipe discharge nozzle which is of a simplified structure while nonetheless being reliable in operation to afford sealing integrity under the conditions likely to obtain in relation to the fuel tank.

In accordance with the present invention the foregoing and other objects are attained by a discharge nozzle for a filling pipe of a fuel tank, for example for a motor vehicle, comprising a check flap which is held under a spring loading in a closed position in which it is caused to bear pivotably against the mouth opening of the discharge nozzle. The check flap is sealed in relation to the discharge nozzle in the closed position, by way of a sealing element with a peripherally extending sealing lip. The sealing lip extends radially outwardly in relation to the cross-section of the discharge opening and the sealing lip bears against a sealing surface of the check flap.

The design configuration of the sealing arrangement according to the invention provides that the sealing effect is increased when there is system pressure applied to the check flap, whether it is caused by an increased pressure in the container or whether it is caused by a column of fuel acting there at.

In accordance with a preferred feature of the invention the sealing lip opens in a direction towards the check flap in a tulip configuration or a conical configuration. That excludes the seal lifting off due to a pressure acting radially thereon. The sealing action is enhanced by the pressure acting in the closing direction of the check flap, in which respect the outer edge of the sealing lip is pressed over the entire pressure range against the sealing surface, which co-operates therewith, of the check flap. The configuration of the sealing lip in accordance with the invention also has the advantage that mechanical damage to the sealing lip when introducing a fuel removal hose into the filling pipe of the motor vehicle fuel tank can be reliably avoided.

In a further preferred feature of the invention the sealing element includes a base ring and a sealing lip which extends therefrom, the base ring extending around the mouth opening of the discharge nozzle.

In a preferred feature of the discharge nozzle of the invention the mouth opening of the discharge nozzle forms an abutment for the check flap in such a way that, when the check flap is in the closed condition of bearing against the abutment, a radially open gap remains as a deformation travel storage means for the sealing lip. That effectively avoids fatigue phenomena or mechanical impairment of the sealing lip.

In another preferred feature the means for mounting the check flap pivotably between the open position and the closed position comprise floating mounting means so that the check flap is oriented of its own accord in relation to the conically opening, peripherally extending sealing lip.

In a configuration of that preferred feature the check flap is mounted in a hinge, the hinge having hinge pins which are mounted movably in slots. Thus the hinge pivotably supports the check flap, with the hinge comprising hinge pins and the check flap having slots in which the hinge pins are movably mounted.

In order to ensure that the check flap is pressed against the seal with a pressing force which is as uniform as possible, a preferred feature of the invention provides that the check flap is held in the closed position by means of a double-leg spring.

In a further preferred feature the sealing element can be fixed to the periphery of the discharge nozzle by way of a holding ring. It is then desirable if the check flap is mounted pivotably to the holding ring.

In another advantageous feature of the invention a groove channel is provided between the holding ring and the nozzle, for receiving and fixing the sealing element.

A preferred feature of that configuration provides that the base ring of the sealing element is increased in thickness in a bead-like configuration and forms in the groove channel a sealing means between the holding ring and the discharge nozzle.

To form the above-mentioned abutment for the check flap the mouth opening of the discharge nozzle can project in the flow direction of the fuel to be introduced through the filling pipe, beyond the groove channel for receiving the sealing element.

In another preferred configuration of the discharge nozzle according to the invention the mouth opening of the discharge nozzle is arranged in eccentric relationship with respect to the connection of the discharge nozzle, which is in opposite relationship to the check flap. In that way it is possible for the discharge nozzle to be designed with a certain minimum inside diameter in dependence on the maximum permissible refueling volume flow, while at the same time the outside diameter does not exceed a predetermined maximum. In that way the check flap, the mounting means thereof and the holding ring are within the projected diameter of the discharge nozzle.

It will be noted that the eccentric arrangement of the check flap with respect to the discharge nozzle also affords the advantage that lower pressure losses occur in a refueling process as the flow is guided in the direction of opening of the check flap. The diameter of the check flap with mounting means is no greater than the discharge nozzle diameter, and this therefore favors the assembly process, in other words introduction of the discharge nozzle into the corresponding opening on the fuel tank.

For the purposes of protecting the spring and the hinge prior to and upon fitment of the check valve it is advantageous, in accordance with a further feature of the invention, if the holding ring forms a spring housing for receiving the spring operable to hold the check valve in its closed position.

Further objects, features and advantages of the invention will be apparent from the description hereinafter of a preferred embodiment.

BRIEF DESCRIPTION OF THE DRAWING

FIG. 1 shows a perspective view of a discharge nozzle for a fuel tank filling pipe according to the invention, FIG. 2 shows a view of the FIG. 1 discharge nozzle in the direction of the arrow indicated by II in FIG. 1, FIGS. 4 and 5 show corresponding views of the discharge nozzle with the check flap in the partially and completely open positions.

DESCRIPTION OF THE PREFERRED EMBODIMENT

Figure 3A:
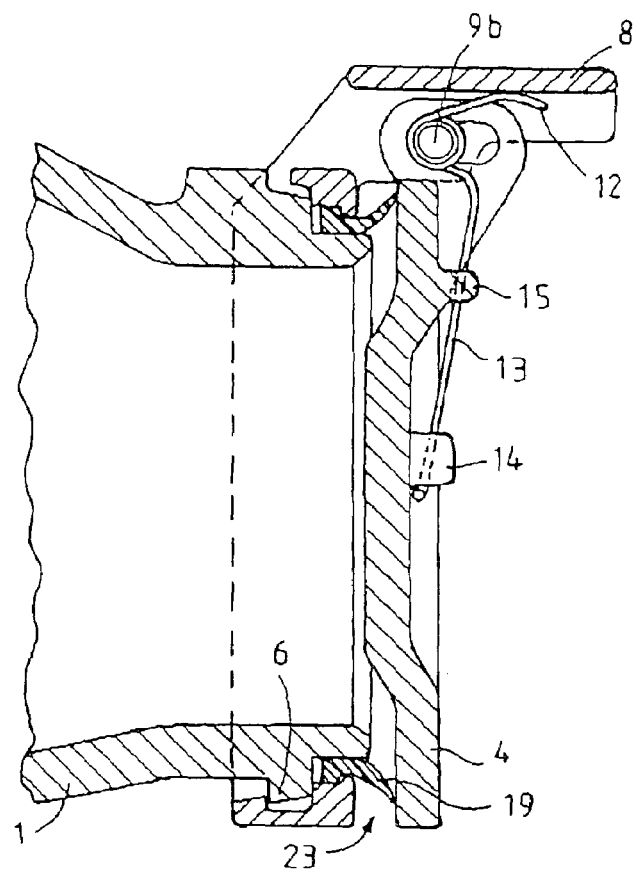
FIG. 3a shows a view in section taken along line III—III in FIG. 2 with the check flap in the closed position.

Referring to FIG. 1, reference numeral 1 therein denotes a discharge nozzle for a filling pipe of a fuel tank such as for example for a motor vehicle. The discharge nozzle 1 is connected to the filling pipe in a condition of prolongation of the discharge end of the filling pipe of the fuel tank so that the discharge nozzle 1 is thus disposed in the interior of the fuel tank. The filling pipe itself, like the fuel tank, are not shown for the sake of simplicity of the drawing but the positions thereof in relation to the discharge nozzle will be readily apparent from FIG. 1.

As can be seen for example from FIG. 1 the discharge nozzle 1 comprises a nozzle body which has a mouth opening region indicated at 2, the through-flow cross-section of which tapers in a downstream direction in relation to a flow of fuel which is being introduced into the fuel tank through the filling pipe. The mouth opening region 2 has a mouth opening referenced 3 in for example FIGS. 4 and 5 and is closed by a check flap 4 when the latter is in a closed position thereof. The check flap 4 is pivotably movably mounted to a holding ring 5 which is in the form of a separate component fitted to the end of the filling pipe. The holding ring 5 in turn is held in latched engagement with the discharge nozzle 1 in the mouth opening region 2 thereof. For that purpose the discharge nozzle 1 is provided with a peripherally extending collar which is indicated at 6 in FIGS. 3 through 6 and which co-operates with an internally peripherally extending latching groove 7 in the holding ring 5.

A spring housing identified by reference 8 is integrally formed on the holding ring 5. For that purpose the holding ring 5 is illustrated in the form of an injection molding. As can be seen from FIG. 2, injection molded to the flanks of the spring housing 8 at each of the two sides thereof are respective pins 9a and 9b which serve on the one hand as hinge pins 9a and on the other hand as holding pins 9b for a double-leg spring 10. As can be seen from FIG. 2 the double-leg spring 10 has two legs which converge downwardly in FIG. 2 and the respective upper ends of which each form respective coil windings 11 which are fitted on to the holding pins 9b. The coil windings 11 also provide respective arms indicated at 12 in for example FIGS. 3a and 3b, which bear against the inside surface of the spring housing 8. That co-operation can be most clearly seen from FIGS. 3 through 5.

The two downwardly converging legs of the spring 10 form a pivotal loop indicated at 13 in FIG. 2 which in turn bears against the check flap 4, being prevented from slipping out of position thereon by means of a holding projection 14 around which the loop 13 passes. The legs 11 of the double-leg spring are also secured in position by way of a spreading element 15 disposed therebetween so that they cannot slip down from the holding pins 9b.

Figure 3B:
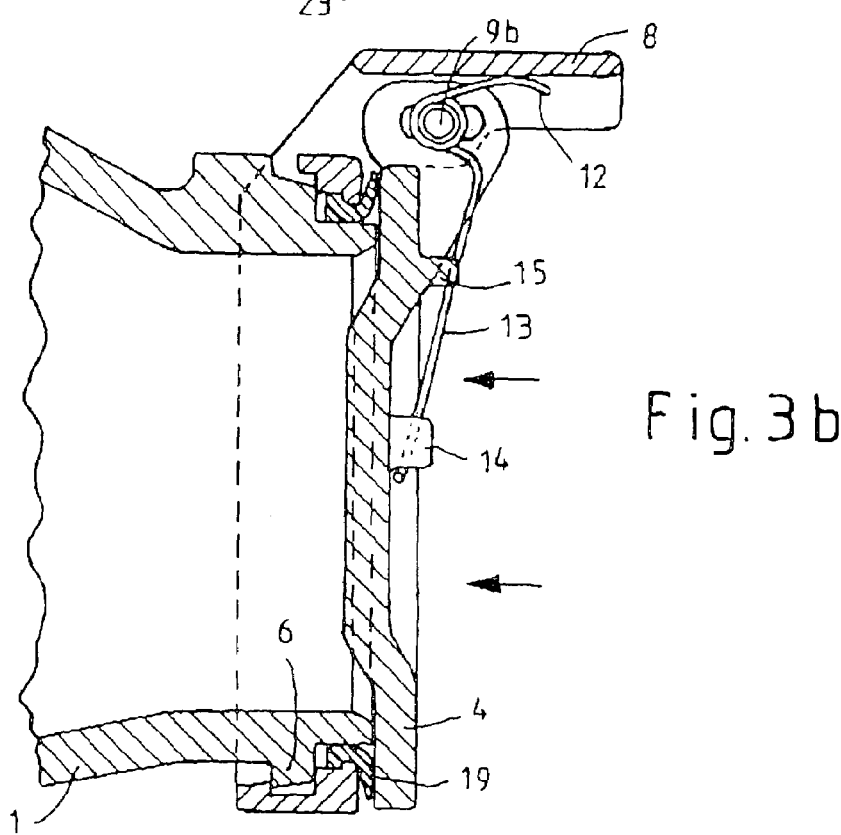
FIG. 3b shows a view in section corresponding to that shown in FIG. 3a, with the check flap pressed against the mouth opening of the discharge nozzle.

The hinge 16 for the check flap 4 further includes two eyes 24 which are each in the form of a slot and in which the hinge pins 9a are movably mounted so that the check flap 4 bears in a floating condition against a sealing lip referenced 19 on the end of the discharge nozzle 1, as can be clearly seen from FIGS. 3a and 3b.

Referring now to FIGS. 4 and 5, reference 17 therein denotes a sealing element which is disposed between the check flap 4 and the mouth opening 3 of the discharge nozzle 1, being mounted to the latter. The sealing element 17 comprises a base ring 18 which is thickened in a bead-like configuration and which has the above-mentioned sealing lip 19 formed in one piece thereon and projecting therefrom. As can be seen for example from FIGS. 4 and 5 the sealing lip 19 is inclined radially outwardly with respect to the cross-section of the mouth opening 3 when the check flap 4 is not in its closed position, in other words the sealing lip enlarges in a conical configuration or a tulip configuration in a direction towards the check flap 4 so that a pressure acting on the check flap 4 enhances the sealing effect of the sealing lip 19 by moving it from the position shown in FIGS. 4 and 5 into the position shown for example in FIG. 3b. When the check flap 4 is closed the sealing lip 19 bears against the underneath flat sealing surface thereof as indicated at 20 in FIG. 4.

Figure 6:
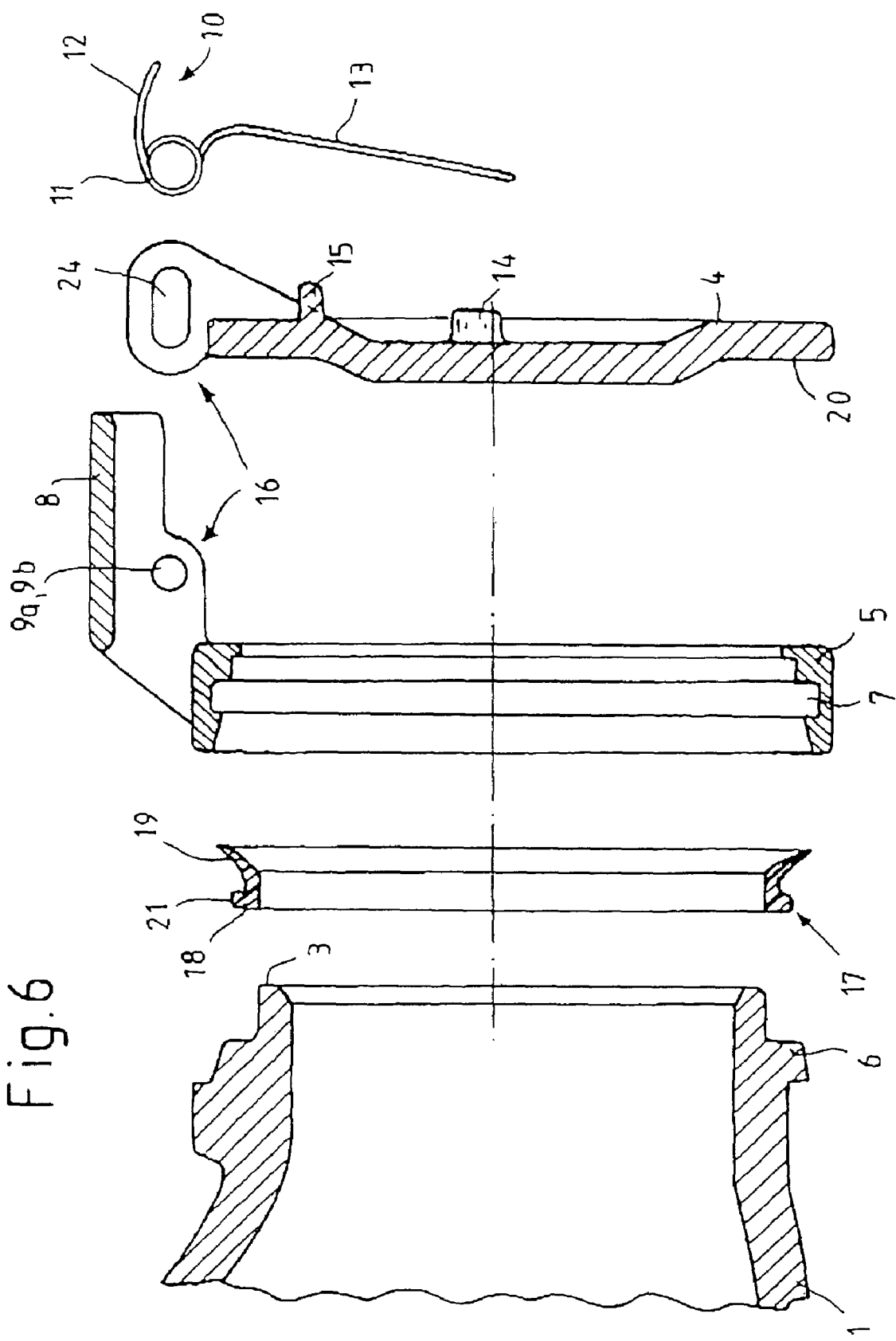
FIG. 6 shows an exploded view of the discharge nozzle according to the invention.

As mentioned hereinbefore the base ring 18 is provided with a bead-like thickening indicated at 21 in FIG. 6 which also faces radially outwardly and which is fixed in a groove channel 22 formed between the holding ring 5 and the discharge nozzle 1 in the region of the mouth opening 3 thereof. The cross-sectional profile of the holding ring 5 is so selected that the groove channel 22 is narrowed in a direction towards the check flap 4 so that the base ring 18 of the sealing element 17 cannot slip out of the groove channel 22. In addition the thickening 21 of the base ring 18 which extends around the mouth opening 3 of the discharge nozzle 1 seals off the intermediate space between the holding ring 5 and the discharge nozzle 1 in relation to any incoming fuel at that location.

The way in which the check flap 4 is mounted in floating relationship in the hinge 16 means that the check flap 4 can itself assume the appropriate orientation in the radially outwardly enlarging sealing seat afforded by the sealing lip 19.

In order to prevent the sealing lip 19 from being mechanically overstressed the holding ring 5 is arranged in set-back relationship with respect to the mouth opening 3 of the discharge nozzle 1 so that the mouth opening 3 forms an abutment for the movement of the check flap 4 towards the closed position thereof. When the check flap 4 is in a condition of bearing against the abutment a radially peripherally extending gap 23 is formed as a deformation travel storage means for the sealing lip 19. The sealing element 17 on which the sealing lip 19 is formed can for that purpose comprise for example a fluorinated elastomer.

Referring now to FIG. 3b, an increased force which acts from the interior of the fuel tank on the check flap 4 provides that the check flap 4 is pressed with the sealing surface 20 against the sealing element 17 and more specifically the sealing lip 19, in which case the sealing element 17 is partially accommodated in the gap 23, by virtue of the deformation of the sealing element 17. In this situation the check flap 4 bears against the mouth opening 3 of the discharge nozzle 1. The sealing lip 19 bears against the sealing surface 20 of the check flap 4 over the entire deformation travel of the sealing element 17.

Referring back now to FIG. 1 it will be seen that the axis of symmetry of the mouth opening region 2 is in displaced relationship with the axis of symmetry of the rest of the discharge nozzle 1 so that the mouth opening 3 of the discharge nozzle 1 is arranged eccentrically with respect to the cross-section of the discharge nozzle 1 or with respect to the cross-section of the filling pipe so that, as is also apparent from the plan view shown in FIG. 2, the check flap 4 with holding ring 5, spring housing 8 and hinge 16 is of a diameter which is $\leqq$ the diameter of the discharge connection 1 and $\leqq$ the diameter of the filling pipe. That simplifies fitment of the filling pipe in a fuel tank of plastic material, through a fitment opening which is cut out therein.

In addition the described geometry of the mouth opening region 2 is advantageous in terms of opening of the check flap 4 by virtue of the incoming flow of fuel passing through the filling pipe and into the fuel tank. More specifically the flow of fuel is not disturbed by projections on the side of the mouth opening region 2 which is in opposite relationship to the hinge 16, so that at that location the full force of the jet of fuel which is entering through the filling pipe without any retardation or disturbance effect can be put to use for the purposes of moving the check flap 4 into the open position.

It will be appreciated that the above-described embodiment of the invention has been set forth solely by way of example and illustration of the principles of the invention and that various modifications and alterations may be made therein without thereby departing from the spirit and scope of the invention.

What is claimed is:

1. A discharge nozzle for a filling pipe of a fuel tank comprising
    a nozzle body having a mouth opening,
    a check flap having a sealing surface,
    means for mounting the check flap on the nozzle body pivotably between an open position and a closed position in which it bears pivotably against the mouth opening of the nozzle body,
    a spring which loads the check flap towards the closed position and which under the pressure of fuel flowing into said tank allows said check flap to reach an open position, and
    a sealing element with a peripherally extending sealing lip on the nozzle body, the sealing lip extending radially outwardly in relation to the cross-section of the mouth opening and the sealing lip bearing against the sealing surface of the check flap in the closed position thereof, wherein the check flap mounting means include a hinge pivotably supporting the check flap, the hinge comprising hinge pins and the check flap having slots, the hinge pins being mounted movably in said slots such that the check flap is floatingly mounted.

2. A nozzle as set forth in claim 1 wherein the sealing element includes a base ring and the sealing lip extends therefrom, the base ring extending around the mouth opening of the nozzle.

3. A nozzle as set forth in claim 1 wherein the sealing lip opens in a direction towards the check flap in a tulip configuration.

4. A nozzle as set forth in claim 1 wherein the sealing lip opens in a direction towards the check flap in a conical configuration.

5. A nozzle as set forth in claim 1 wherein the mouth opening of the nozzle forms an abutment for the check flap such that when the check flap is in the closed condition of bearing against the abutment a radially open gap remains as a deformation travel storage means for the sealing lip.

6. A nozzle as set forth in claim 1 wherein the spring which loads the check flap is a double-leg spring for holding the check flap in the closed position.

7. A nozzle as set forth in claim 1 including a holding ring fixing the sealing element to the periphery of the nozzle body.

8. A nozzle as set forth in claim 7 wherein the check flap mounting means mount the check flap pivotably to said holding ring.

9. A nozzle as set forth in claim 7 including a groove channel between the holding ring and the nozzle body for receiving and fixing the sealing element.

10. A nozzle as set forth in claim 8 including a groove channel between the holding ring and the nozzle body for receiving and fixing the sealing element.

11. A nozzle as set forth in claim 9 wherein the mouth opening of the nozzle body projects in the flow direction of fuel to be introduced through the filling pipe beyond the groove channel for receiving the sealing element.

12. A nozzle as set forth in claim 10 wherein the mouth opening of the nozzle body projects in the flow direction of fuel to be introduced through the filling pipe beyond the groove channel for receiving the sealing element.

13. A nozzle as set forth in claim 1 wherein the mouth opening of the nozzle body is arranged in eccentric relationship with the connection end of the nozzle body, which is in opposite relationship to the check flap.

14. A nozzle as set forth in claim 7 wherein the holding ring forms a spring housing for receiving the spring for holding the check flap in the closed position thereof.

* * * * *

(12) EX PARTE REEXAMINATION CERTIFICATE (8153rd)
United States Patent
Kolberg

(10) Number: US 7,182,109 C1
(45) Certificate Issued: Apr. 12, 2011

(54) FILLING PIPE DISCHARGE NOZZLE

(75) Inventor: Ralf Kolberg, Bruhl (DE)

(73) Assignee: Kautex Textron GmbH & Co. KG, Bonn (DE)

Reexamination Request:
No. 90/011,015, Jul. 1, 2010

Reexamination Certificate for:
Patent No.: 7,182,109
Issued: Feb. 27, 2007
Appl. No.: 11/344,593
Filed: Jan. 31, 2006

(30) Foreign Application Priority Data

Jan. 31, 2005 (DE) .................. 10 2005 004 551

(51) Int. Cl.
*B65B 1/04* (2006.01)

(52) U.S. Cl. ................. 141/301; 141/198; 220/86.2; 137/592

(58) Field of Classification Search ........................ None
See application file for complete search history.

(56) References Cited

U.S. PATENT DOCUMENTS

| | | | |
|---|---|---|---|
| 4,809,741 | A | 3/1989 | Scaramucci |
| 5,431,199 | A | 7/1995 | Benjay et al. |
| 6,189,581 | B1 | 2/2001 | Harris et al. |

FOREIGN PATENT DOCUMENTS

| | | |
|---|---|---|
| DE | 200 01 334 U1 | 4/2001 |
| EP | 1 415 844 A2 | 5/2004 |

*Primary Examiner*—Joseph A. Kaufman

(57) ABSTRACT

A discharge nozzle for the filling pipe of a motor vehicle fuel tank for the introduction of fuel into the tank includes a check flap which is held by spring loading in a closed position, being caused to bear pivotably against the mouth opening of the nozzle. The check flap is sealed in relation to the mouth opening of the nozzle by way of at least one sealing element with a peripherally extending sealing lip. The sealing lip extends radially outwardly in relation to the cross-section of the discharge mouth opening.

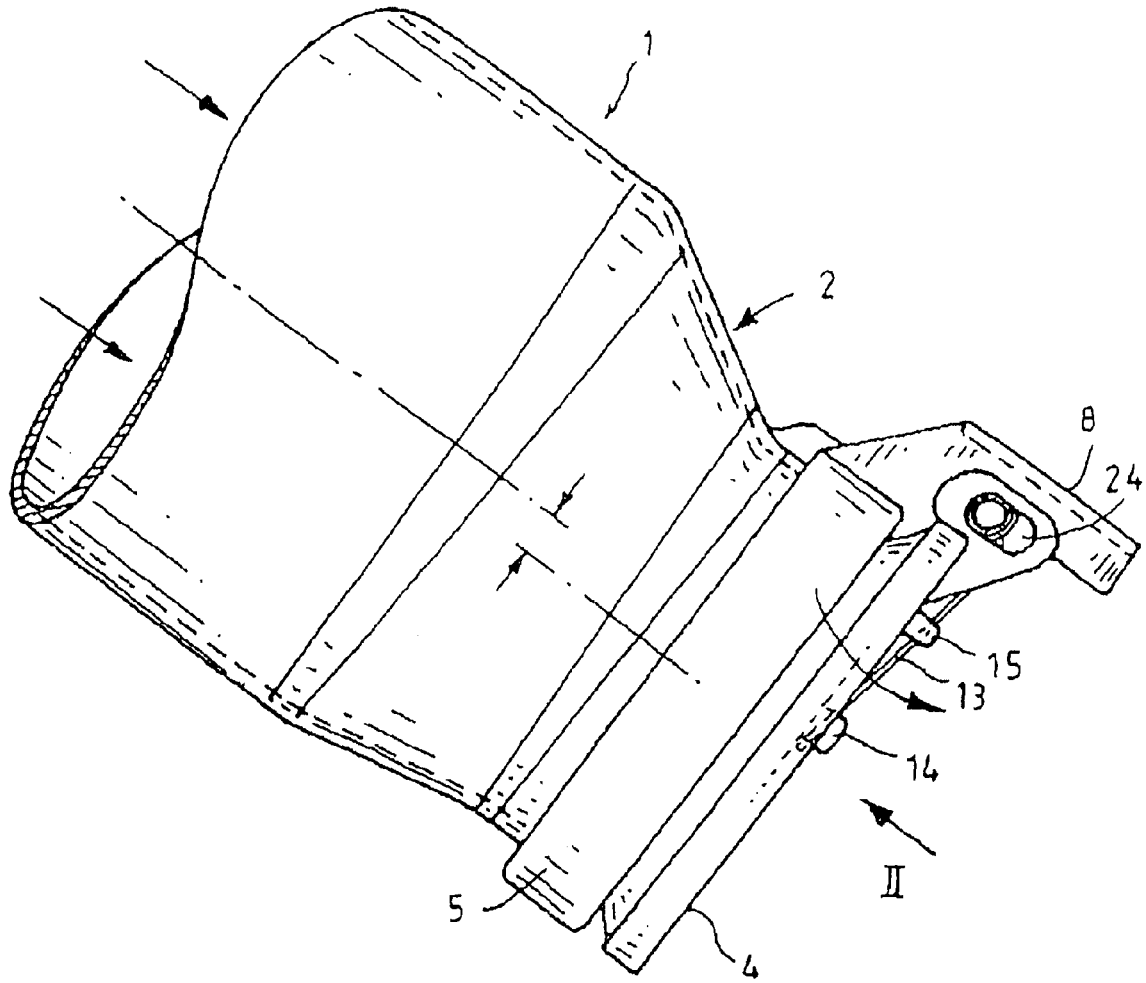

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claim 1 is confirmed.

Claims 2-14 were not reexamined.

* * * * *